US012771242B2

(12) United States Patent
Chen

(10) Patent No.: US 12,771,242 B2
(45) Date of Patent: Oct. 20, 2026

(54) CONTROL METHOD AND CONTROL CIRCUIT FOR POWER FACTOR CORRECTION CIRCUIT

(71) Applicant: LITE-ON TECHNOLOGY CORPORATION, Taipei (TW)

(72) Inventor: Po-Ming Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 175 days.

(21) Appl. No.: 18/820,348

(22) Filed: Aug. 30, 2024

(65) Prior Publication Data

US 2026/0018992 A1 Jan. 15, 2026

(30) Foreign Application Priority Data

Jul. 15, 2024 (CN) ........................ 202410944634.6

(51) Int. Cl.

*H02M 1/42* (2007.01)
*H02M 1/00* (2007.01)
*H02M 1/32* (2007.01)

(52) U.S. Cl.

CPC ....... *H02M 1/4233* (2013.01); *H02M 1/0003* (2021.05); *H02M 1/32* (2013.01); *H02M 1/0009* (2021.05)

(58) Field of Classification Search

CPC .... H02M 1/0003; H02M 1/0009; H02M 1/32; H02M 1/42–4233

See application file for complete search history.

(56) References Cited

U.S. PATENT DOCUMENTS

2012/0262132 A1* 10/2012 Park ........................ H02M 1/42 323/207
2014/0049181 A1* 2/2014 Kelly ...................... H02M 1/42 323/207
2015/0137784 A1* 5/2015 Sugawara ............ H02M 3/156 323/282
2016/0181942 A1* 6/2016 Sugawara ............ H02M 3/158 363/126
2021/0013806 A1* 1/2021 Yaguchi .................. H02M 1/08
2021/0104946 A1* 4/2021 Hiasa ...................... H02M 1/32

FOREIGN PATENT DOCUMENTS

CN 111771326 B 1/2022
CN 116015044 A 4/2023

OTHER PUBLICATIONS

Office Action issued by Taiwan Intellectual Property Office on Jan. 10, 2025.

* cited by examiner

*Primary Examiner* — Fred E Finch, III
(74) *Attorney, Agent, or Firm* — WPAT, PC

(57) ABSTRACT

A control method and a control circuit for a power factor correction (PFC) circuit are provided. The control method for the PFC circuit includes the following steps. Whether a recoverable protection action is occurred or stopped is determined. During the recoverable protection action, a count value is counted. When the recoverable protection action is stopped, a discharge current of an output capacitor of the PFC circuit is analyzed at least according to the count value. An output voltage controller is updated according to the discharge current.

15 Claims, 8 Drawing Sheets

CONTROL METHOD AND CONTROL CIRCUIT FOR POWER FACTOR CORRECTION CIRCUIT

This application claims the benefit of China application Serial No. 202410944634.6, filed Jul. 15, 2024, the disclosure of which is incorporated by reference herein in its entirety.

TECHNICAL FIELD

The disclosure relates in general to a control method and a control circuit, and more particularly to a control method and a control circuit for a power factor correction (PFC) circuit.

BACKGROUND

The power supply devices used in various electronic systems usually use 110V/220V alternating current (AC). However, due to the nonlinear characteristics of the rectifier, the output voltage (Vbus) and the input current are unstable, which may cause damage to electrical equipment, reduce power efficiency, and waste energy. Power factor correction (PFC) circuit can improve the efficiency of power conversion and reduce harm to public power supply networks and equipment. Therefore, the PFC circuit has been widely used in electronic systems.

However, when the load changes, the output voltage of the PFC circuit often fluctuates severely, and it takes a long time to return to stability, which may cause serious damage to the electronic system. Researchers are working hard to study its occurrence causes and solutions.

SUMMARY

The present disclosure relates to a control method and a control circuit for a power factor correction (PFC) circuit. An appropriate modulation amount of a voltage controller signal is obtained through analysis and processing procedures to provide rapid recovery of the output voltage of the PFC circuit in response to instantaneous load changes. The steady-state control mechanism reduces the fluctuation of the output voltage during the transient period and shortens the time for the output voltage to return to the steady state from the transient state.

According to one embodiment, a control method for a power factor correction (PFC) circuit is provided. The control method for the PFC circuit includes: determining whether a recoverable protective action is occurred or stopped; counting a count value during the recoverable protective action; analyzing a discharge current of an output capacitor of the PFC circuit at least according to the count value when the recoverable protection action is stopped; and updating an output voltage controller according to the discharge current.

According to another embodiment, a control circuit for a power factor correction (PFC) circuit is provided. The control circuit includes a protection determination unit, a counting unit, an analysis unit and an updating unit. The protection determination unit is used to determine whether a recoverable protective action is occurred or stopped. The counting unit is used to count a count value during the recoverable protective action. The analysis unit is used to analyze a discharge current of an output capacitor of the PFC circuit at least according to the count value when the recoverable protection action is stopped. The updating unit is used to update an output voltage controller according to the discharge current.

According to an alternative embodiment, a control circuit for a power factor correction (PFC) circuit is provided. The control circuit is connected to the PFC circuit. The control circuit is used to execute a control method for the PFC circuit. The control method includes: determining whether a recoverable protective action is occurred or stopped; counting a count value during the recoverable protective action; analyzing a discharge current of an output capacitor of the PFC circuit at least according to the count value when the recoverable protection action is stopped; and updating an output voltage controller according to the discharge current.

Figure 1:
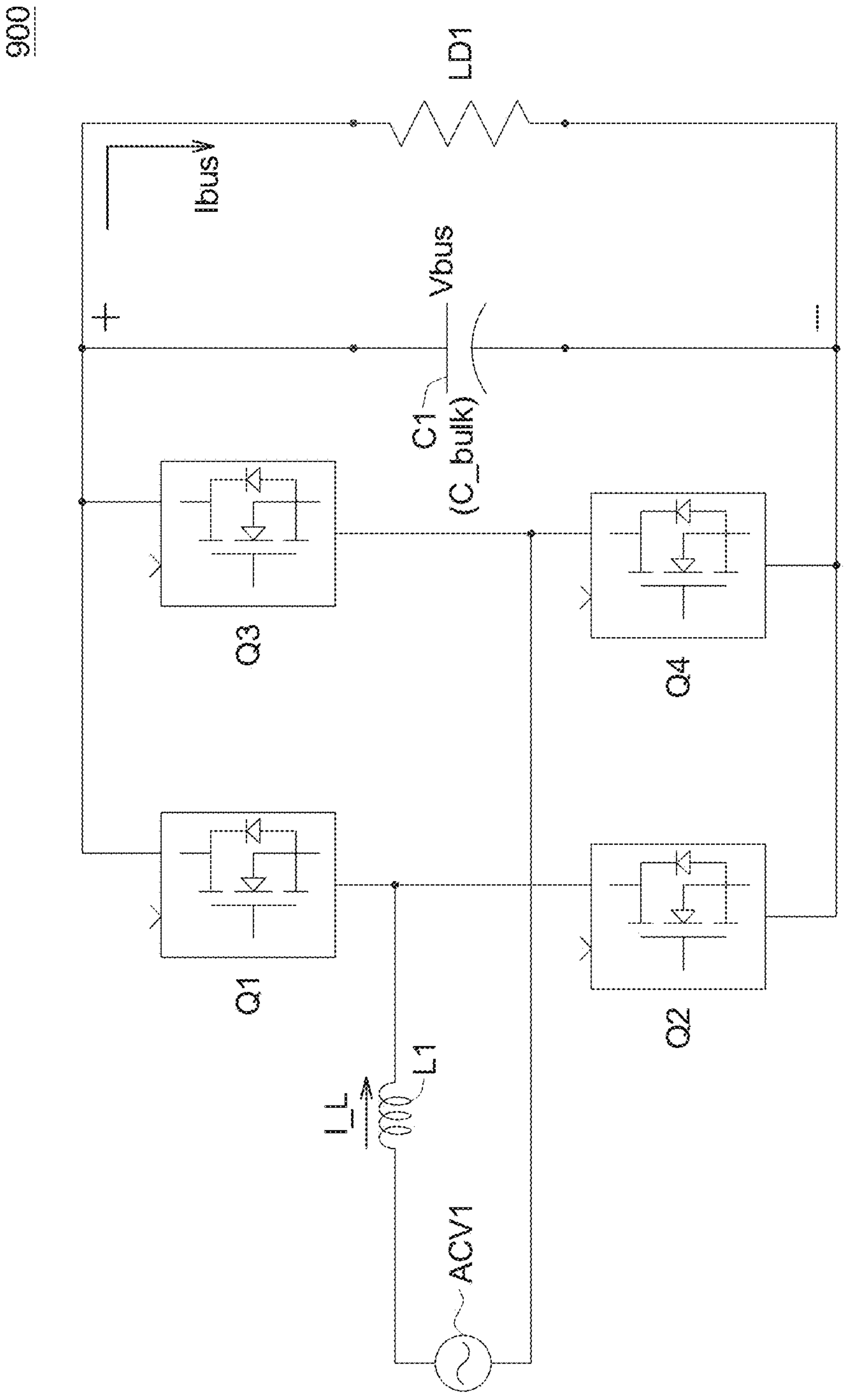
FIG. 1 illustrates a circuit diagram of a power factor correction (PFC) circuit according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a circuit diagram of a power factor correction (PFC) circuit 900 according to one embodiment. The PFC circuit 900 is, for example but not limited to, a Totem-Pole PFC circuit. The PFC circuit 900 includes a power ACV1, an inductor L1, four switching elements Q1, Q2, Q3, Q4, an output capacitor C1 and a load LD1. The inductor L1 is connected in series to the power ACV1. The switching element Q1 is connected in series with the switching element Q2, and the switching element Q3 is connected in series with the switching element Q4. One end of the inductor L1 is connected between the switching element Q1 and the switching element Q2, and one end of the power ACV1 is connected between the switching element Q3 and the switching element Q4. The series-connected switching elements Q1 and Q2 are connected in parallel to the series-connected switching elements Q3 and Q4. The output capacitor C1 is connected in parallel to the series-connected switching elements Q3 and Q4. The load LD1 is connected in parallel to the output capacitor C1. There are an output voltage Vbus and an output current Ibus at an output end of the PFC circuit 900.

Figure 2:
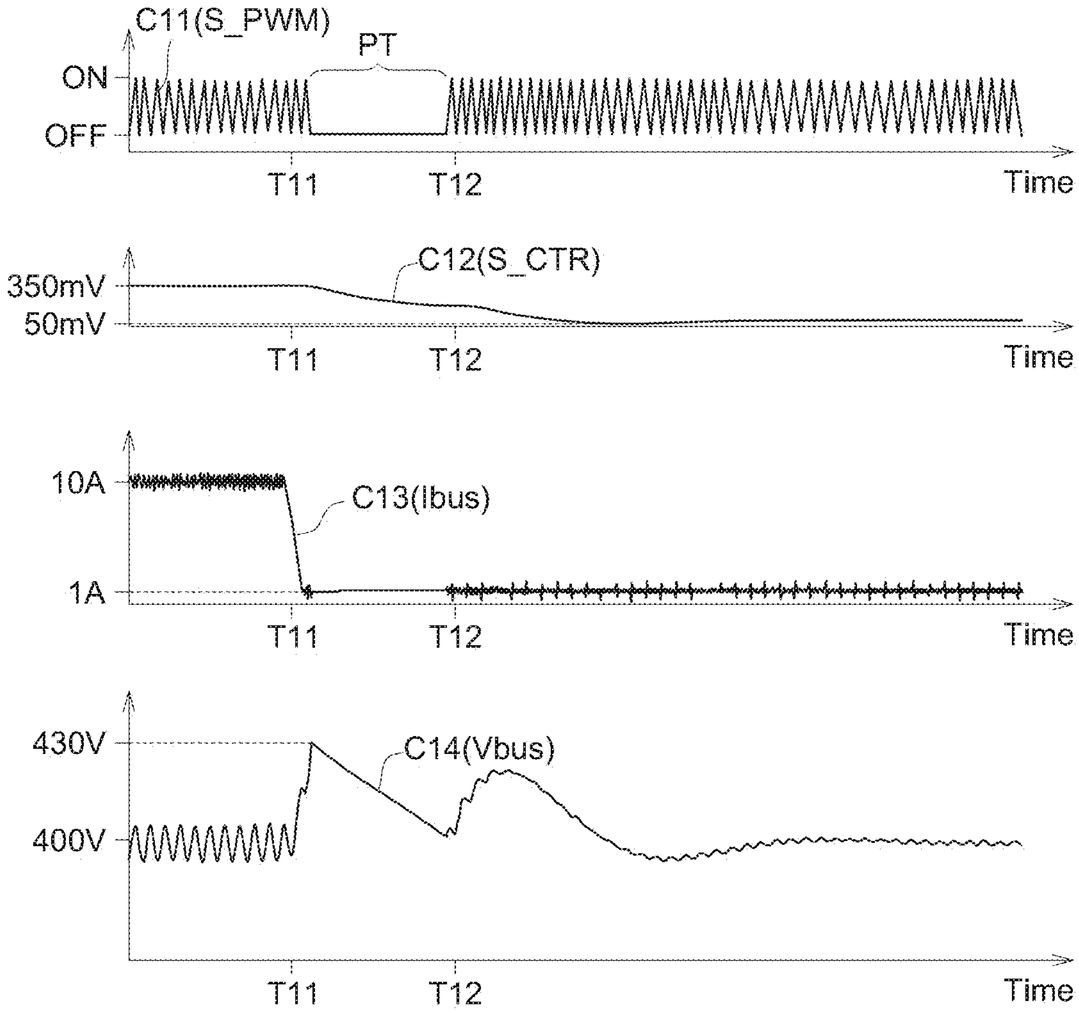
FIG. 2 illustrates the change in a load current of the PFC circuit from 10 A to 1 A according to an embodiment of the present disclosure.

Please refer to FIG. 2, which illustrates the change in the load current Ibus of the PFC circuit 900 from 10 A to 1 A according to an embodiment of the present disclosure. A curve C11 illustrates a pulse width modulation signal, a curve C12 illustrates the control of the output voltage controller, a curve C13 illustrates the load current, and a curve C14 illustrates the output voltage.

At the time point T11, the load current Ibus drops from 10 A to 1 A. At this time, due to the insufficient modulation of a voltage controller signal S_CTR, the output voltage Vbus will start to rise sharply from an ideal voltage, such as but not limited to 400V, and even overshoot to a protection voltage, such as but not limited to 430V. Then, a recoverable protective action PT will be triggered. The recoverable protective action PT is, for example but not limited to, a cycle-by-cycle (CBC) protection.

When the recoverable protective action PT is occurred, the pulse width modulation signal S_PWM will be turned off, and the output voltage Vbus will be gradually decreased.

At the time point T12, when the output voltage Vbus drops to the ideal voltage, the pulse width modulation signal S_PWM will restart. Since the voltage controller signal S_CTR is not modulated correctly and immediately, the output voltage Vbus will rise again, making the voltage stabilization effect of the output voltage Vbus poor during the transient period.

Figure 3:
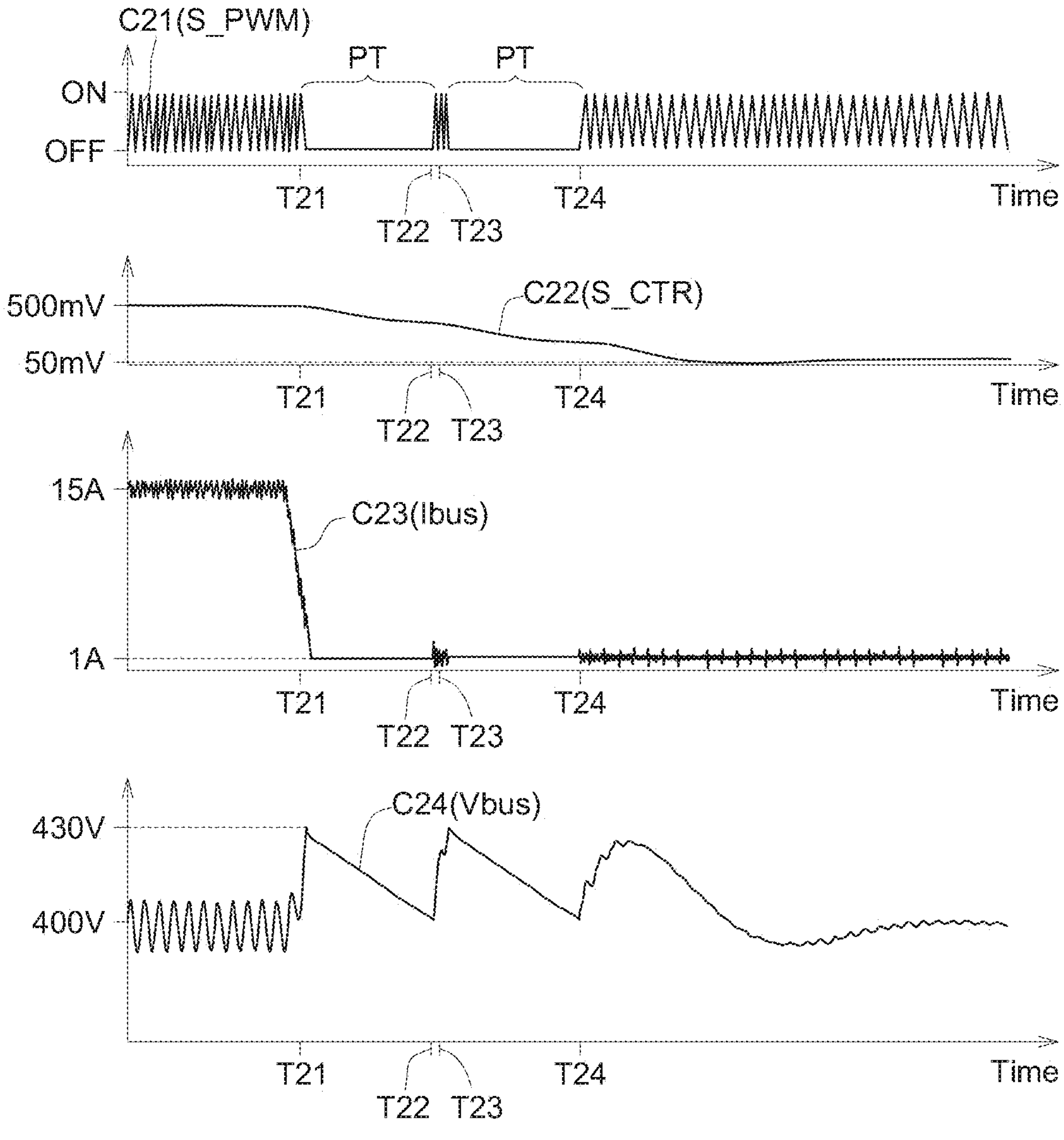
FIG. 3 illustrates the change in the load current of the PFC circuit from 15 A to 1 A according to an embodiment of the present disclosure.

Please refer to FIG. 3, which illustrates the change in the load current Ibus of the PFC circuit 900 from 15 A to 1 A according to an embodiment of the present disclosure. A curve C21 illustrates the pulse width modulation signal, a curve C22 illustrates the control of the output voltage controller, a curve C23 illustrates the load current, and a curve C24 illustrates the output voltage.

At the time point T21, the load current Ibus drops from 15 A to 1 A. At this time, due to the insufficient modulation of the voltage controller signal S_CTR, the output voltage Vbus will start to rise sharply from the ideal voltage, such as but not limited to 400V, or even overshoot to the protection voltage, such as but not limited to 430V. Then, the recoverable protective action PT will be triggered.

When the recoverable protective action PT is occurred, the pulse width modulation signal S_PWM will be turned off, and the output voltage Vbus will be gradually decreased.

At the time point T22, when the output voltage Vbus drops to the ideal voltage, the pulse width modulation signal S_PWM will restart. Since the voltage controller signal S_CTR is not modulated correctly and immediately, the output voltage Vbus will rise again, and the recoverable protective action PT may be triggered again at the time point T23, resulting in poor voltage stabilization effect of the output voltage Vbus during the transient period.

At the time point T24, when the output voltage Vbus drops to the ideal voltage, the pulse width modulation signal S_PWM will restart. Since the voltage controller signal S_CTR has not been modulated correctly and immediately, the output voltage Vbus will rise again, making the voltage stabilization effect of the output voltage Vbus poor during the transient period.

Figure 4:
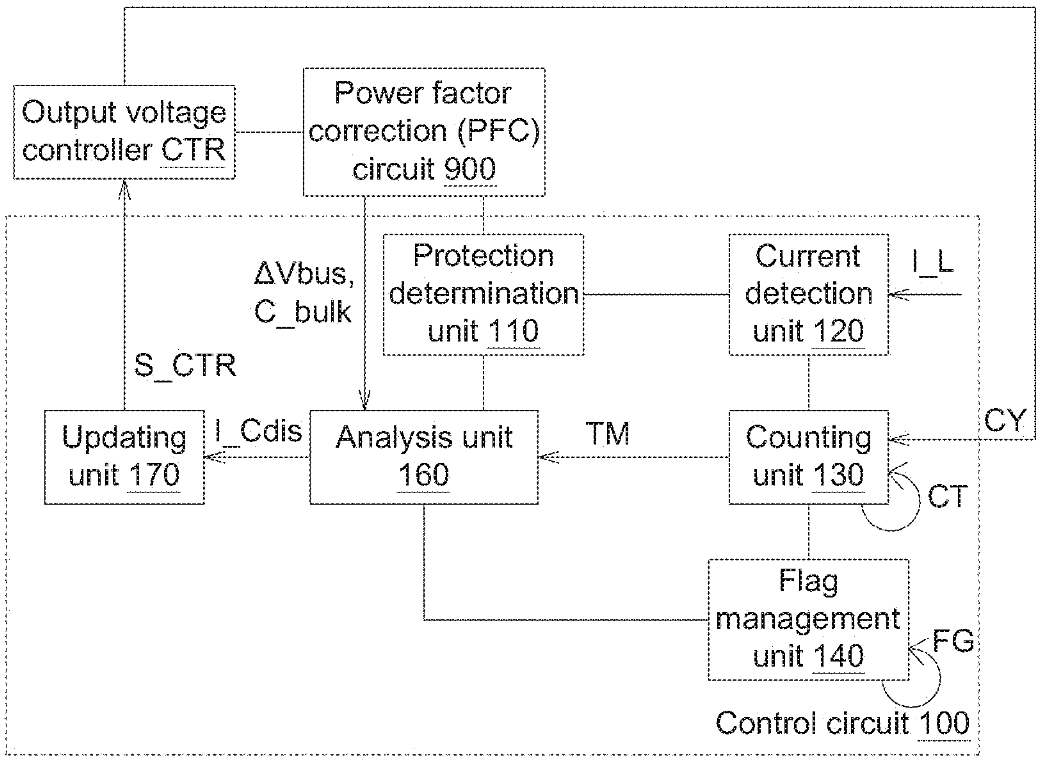
FIG. 4 illustrates a block diagram of the PFC circuit and the control circuit for the same according to an embodiment.
Figure 5:
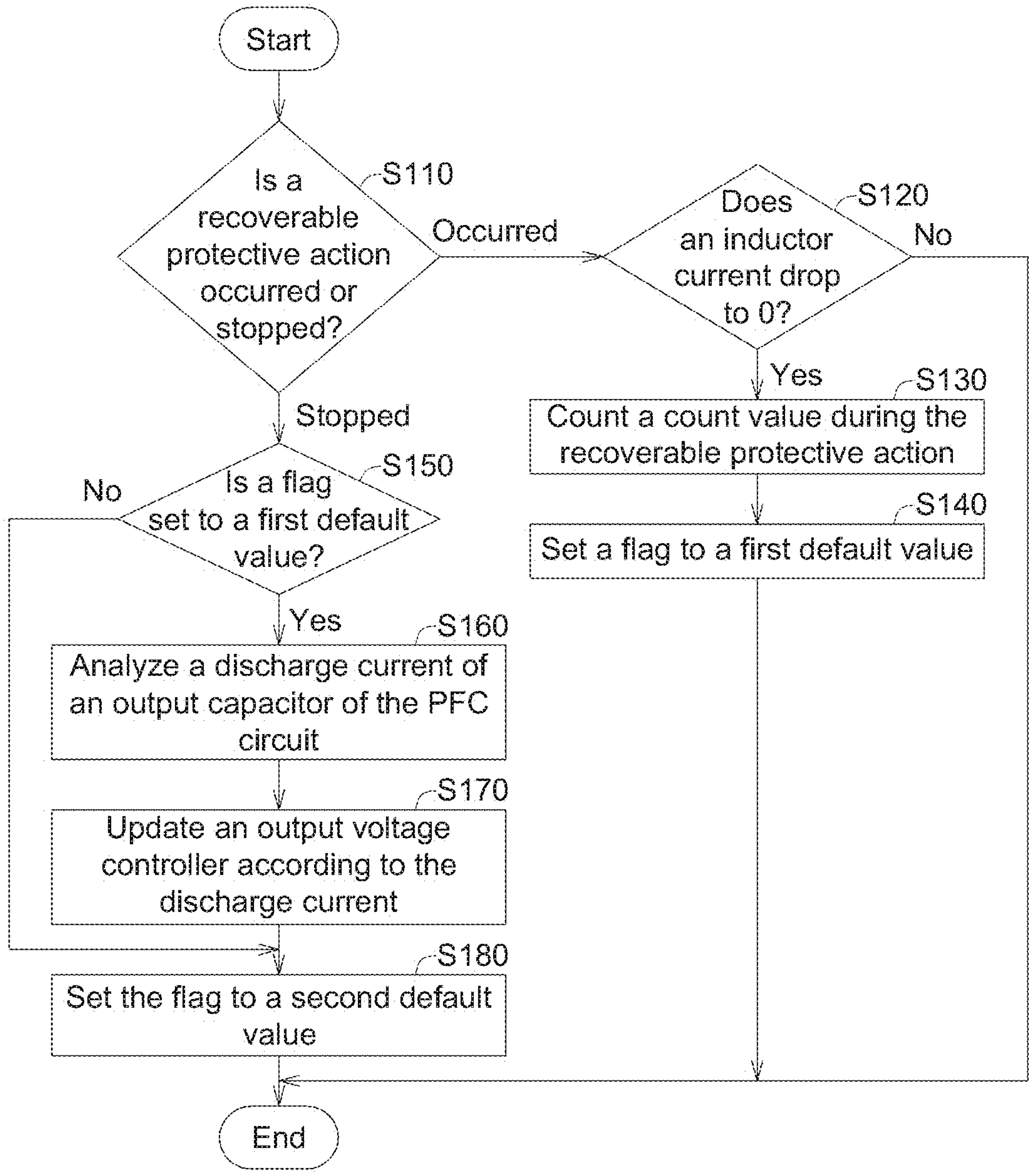
FIG. 5 illustrates a flow chart of a control method for the PFC circuit.

The researchers found that the main reason for the poor voltage stabilization effect of the output voltage Vbus during the transient period was that the voltage controller signal S_CTR failed to modulate correctly and immediately. Therefore, the control method and the control circuit 100 for the PFC circuit 900 are proposed. Please refer to FIGS. 4 and 5. FIG. 4 illustrates a block diagram of the PFC circuit 900 and the control circuit 100 for the same according to an embodiment. FIG. 5 illustrates a flow chart of the control method for the PFC circuit 900. The control circuit 100 includes a protection determination unit 110, a current detection unit 120, a counting unit 130, a flag management unit 140, an analysis unit 160 and an updating unit 170. The control circuit 100 is, for example, a chip or an internal firmware of a digital signal processor. The protection determination unit 110, the current detection unit 120, the counting unit 130, the flag management unit 140, the analysis unit 160 and/or the updating unit 170 is, for example, circuit or firmware. In this embodiment, the control circuit 100 could obtain the appropriate modulation amount of the voltage controller signal S_CTR through analysis and processing procedures, so that the voltage controller signal S_CTR could be modulated correctly and immediately, reducing the fluctuation of the output voltage Vbus during the transient period, and shortening the time for the output voltage Vbus to return from the transient state to the steady state.

As shown in FIG. 5, in the step S110, the protection determination unit 110 determines whether the recoverable protective action PT is occurred or stopped. If the recoverable protective action PT is occurred, the process proceeds to the step S120; if the recoverable protective action PT is stopped, the process proceeds to the step S150.

In the step S120, the current detection unit 120 determines whether an inductor current I_L drops to 0. This step is used to confirm whether the switching element Q1 is completely turned off. If the inductor current I_L drops to 0, the process proceeds to the step S130.

In the step S130, the counting unit 130 accumulates a count value CT during the recoverable protective action PT.

Next, in the step S140, the flag management unit 140 sets a flag FG to a first default value (for example, "1"). For example, the flag FG is preset to a second default value (for example, "0"). Once the flag FG is queried to be the first default value, it means that the recoverable protective action PT has just been executed and the count value CT has been obtained. In one embodiment, the step S140 could be omitted and implemented by other process designs.

As shown in FIG. 5, when the recoverable protective action PT is stopped, the process proceeds to the step S150. In the step S150, the flag management unit 140 determines whether the flag FG is set to the first preset value. If the flag FG is set to the first preset value, the process proceeds to the step S160. Once the flag FG is queried to be the first default value, it means that the recoverable protective action PT has just been executed and the count value CT has been obtained.

Figure 6:
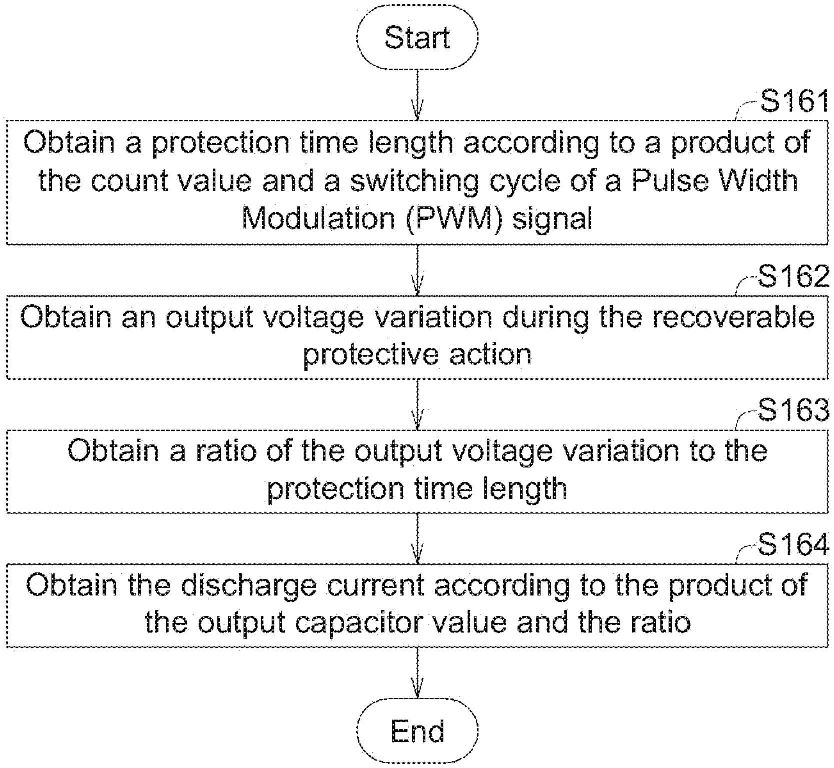
FIG. 6 illustrates a detailed flow chart of the step S160 according to an embodiment of the present disclosure.

In the step S160, the analysis unit 160 analyzes a discharge current I_Cdis of the output capacitor C1 of the PFC circuit 900 at least according to the count value. Please refer to FIG. 6, which illustrates a detailed flow chart of the step S160 according to an embodiment of the present disclosure. The step S160 includes steps S161 to S164. In the step S161, the analysis unit 160 obtains a protection time length TM according to the product of the count value CT and the switching cycle CY of the pulse width modulation signal S_PWM. In other words, the protection time length TM could be obtained according to the following equation (1).

$$\text{protection time length } TM = \text{count value } CT * \text{switching cycle } CY \quad (1)$$

Then, in the step S162, the analysis unit 160 obtains an output voltage variation ΔVbus during the recoverable protective action PT.

Next, in the step S163, the analysis unit 160 obtains a ratio of the output voltage variation ΔVbus to the protection time length TM.

Then, in the step S164, the analysis unit 160 obtains the discharge current I_Cdis according to a product of the output capacitor value C_bulk of the output capacitor C1 and the ratio. In other words, the discharge current I_Cdis could be obtained according to the following equation (2).

$$\text{discharge current I\_Cdis} = \text{output capacitor value C\_bulk} * \frac{\text{output voltage variation } \Delta Vbus}{\text{protection time length } TM} \quad 2)$$

Then, in the step S170 in FIG. 5, the updating unit 170 updates the output voltage controller CTR according to the discharge current I_Cdis. In this step, the integral term of the voltage controller signal S_CTR of the output voltage controller CTR is directly set to the discharge current I_Cdis, so that the voltage controller signal S_CTR could be modulated correctly and immediately, reducing the fluctuation of the output voltage Vbus (shown in FIG. 1) during the transient period, and shortening the time for the output voltage Vbus to return from the transient state to the steady state.

Then, in the step S180, the flag management unit 140 sets flag FG to a second default value (for example, "0").

Figure 7:
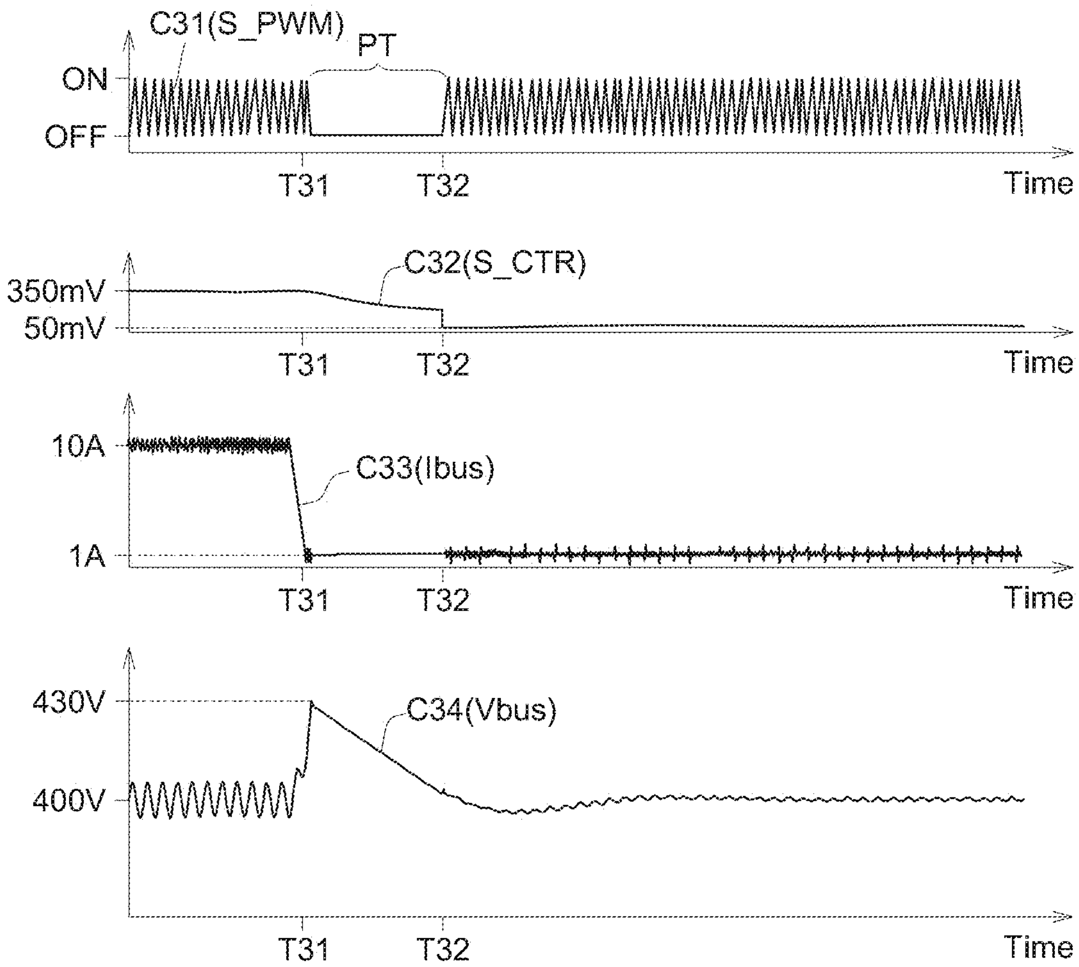
FIG. 7 illustrates the change in the load current of the PFC circuit from 10 A to 1 A under the control of a control circuit according to an embodiment of the present disclosure.

Please refer to FIG. 7, which illustrates the change in the load current Ibus of the PFC circuit 900 from 10 A to 1 A under the control of the control circuit 100 according to an embodiment of the present disclosure. A curve C31 illustrates the pulse width modulation signal, a curve C32 illustrates the control of the output voltage controller, a curve C33 illustrates the load current, and a curve C34 illustrates the output voltage.

At the time point T31, the load current Ibus drops from 10 A to 1 A. At this time, because the voltage controller signal S_CTR is still modulating, the output voltage Vbus will start to rise sharply from the ideal voltage, such as but not limited to 400V, and even overshoot to a protection voltage, such as but not limited to 430V. Then, the recoverable protective action PT will be triggered.

When recoverable protective action PT is occurred, the pulse width modulation signal S_PWM will be turned off, and the output voltage Vbus will be gradually decreased.

At the time point T32, when the output voltage Vbus drops to the ideal voltage, the pulse width modulation signal S_PWM will restart. At this time, the control circuit 100 correctly modulates the voltage controller signal S_CTR, so that the output voltage Vbus will not rise again, effectively improving the voltage stabilization effect of the output voltage Vbus during the transient period.

Figure 8:
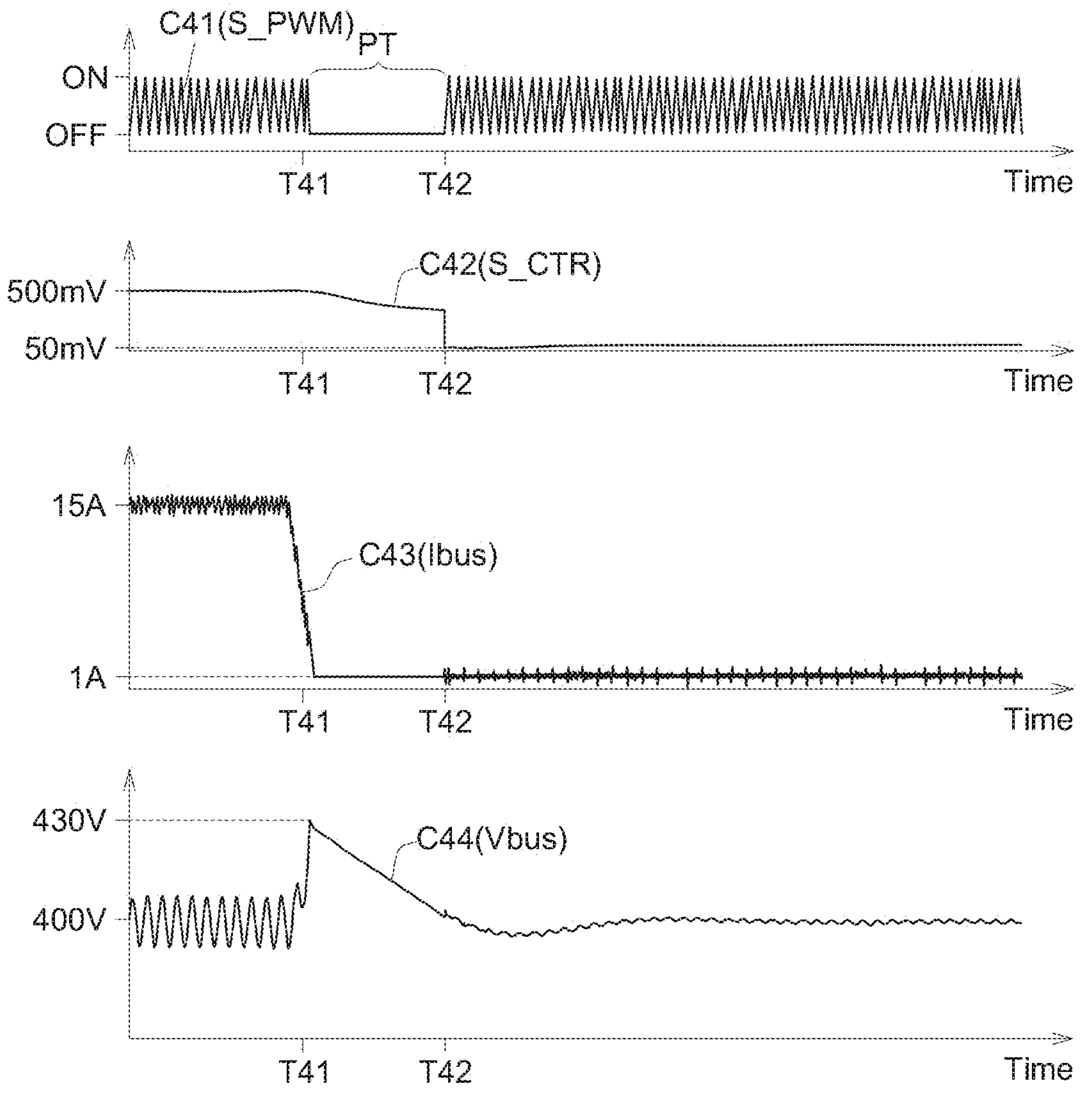
FIG. 8 illustrates the change of the load current of the PFC circuit from 15 A to 1 A under the control of the control circuit according to an embodiment of the present disclosure.

Please refer to FIG. 8, which illustrates the change of the load current Ibus of the PFC circuit 900 from 15 A to 1 A under the control of the control circuit 100 according to an embodiment of the present disclosure. The curve C41 illustrates the pulse width modulation signal, the curve C42 illustrates the control of the output voltage controller, the curve C43 illustrates the load current, and the curve C44 illustrates the output voltage.

At the time point T41, the load current Ibus drops from 15 A to 1 A. At this time, because the voltage controller signal S_CTR is still modulating, the output voltage Vbus will start to rise sharply from the ideal voltage, such as but not limited to 400V, and even overshoot to a protection voltage, such as but not limited to 430V. Then, the recoverable protective action PT will be triggered.

When the recoverable protective action PT is occurred, the pulse width modulation signal S_PWM will be turned off, and the output voltage Vbus will be gradually decreased.

At the time point T42, when the output voltage Vbus drops to the ideal voltage, the pulse width modulation signal S_PWM will restart. At this time, the control circuit 100 correctly modulates the voltage controller signal S_CTR, so that the output voltage Vbus will not rise again, effectively improving the voltage stabilization effect of the output voltage Vbus during the transient period.

According to the above embodiments, the control method and the control circuit 100 for the PFC circuit 900 are provided. The appropriate modulation amount of the voltage controller signal S_CTR is obtained through analysis and processing procedures, so as to provide rapid recovery of the output voltage Vbus of the PFC circuit 900 in response to instantaneous load changes. The steady-state control mechanism reduces the fluctuation of the output voltage Vbus during the transient period and shortens the time for the output voltage Vbus to return to the steady state from the transient state.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A control method for a power factor correction (PFC) circuit, comprising:

determining whether a recoverable protective action has occurred or stopped;

determining whether an inductor current drops to 0;

counting a count value during the recoverable protective action, wherein the count value during the recoverable protective action is accumulated from a time point when the inductor current drops to 0;

analyzing a discharge current of an output capacitor of the PFC circuit at least according to the count value when the recoverable protective action is stopped; and updating an output voltage controller according to the discharge current.

2. The control method for the PFC circuit according to claim 1, wherein the recoverable protective action is a cycle-by-cycle protection (CBC protection).

3. The control method for the PFC circuit according to claim 1, wherein after counting the count value, the control method further comprises:

setting a flag to a first default value;

wherein analyzing the discharge current is performed when the recoverable protective action is stopped and the flag is set to the first default value.

4. The control method for the PFC circuit according to claim 3, wherein after updating the output voltage controller according to the discharge current, the control method further comprises:

setting the flag to a second default value.

5. The control method for the PFC circuit according to claim 1, wherein analyzing the discharge current of the output capacitor of the PFC circuit includes:

obtaining a protection time length according to a product of the count value and a switching cycle of a Pulse Width Modulation (PWM) signal;

obtaining an output voltage variation during the recoverable protective action;

obtaining a ratio of the output voltage variation to the protection time length; and obtaining the discharge current according to the product of a capacitor value of the output capacitor and the ratio.

6. A control circuit for a power factor correction (PFC) circuit, comprising:

a protection determination unit, used to determine whether a recoverable protective action has occurred or stopped;

a current detection unit, used to determine whether an inductor current drops to 0;

a counting unit, used to count a count value during the recoverable protective action, wherein the counting unit accumulates the count value from a time point when the inductor current drops to 0;

an analysis unit, used to analyze a discharge current of an output capacitor of the PFC circuit at least according to the count value when the recoverable protective action is stopped; and an updating unit, used to update an output voltage controller according to the discharge current.

7. The control circuit for the PFC circuit according to claim 6, wherein the recoverable protective action is a cycle-by-cycle protection (CBC protection).

8. The control circuit for the PFC circuit according to claim 6, further comprising:

a flag management unit, used to set a flag to a first default value when the recoverable protective action has occurred;

wherein the analysis unit is used to analyze the discharge current when the recoverable protective action is stopped and the flag is set to the first default value.

9. The control circuit for the PFC circuit according to claim 8, wherein the flag management unit is further used to set the flag to a second default value after the updating unit updates the output voltage controller according to the discharge current.

10. The control circuit for the PFC circuit according to claim 6, wherein the analysis unit is used to obtain a protection time length according to a product of the count value and a switching cycle of a Pulse Width Modulation (PWM) signal; obtain an output voltage variation during the recoverable protective action; obtain a ratio of the output voltage variation to the protection time length; and obtain the discharge current according to the product of a capacitor value of the output capacitor and the ratio.

11. A control circuit for a power factor correction (PFC) circuit, wherein the control circuit is connected to the PFC circuit, the control circuit is used to execute a control method for the PFC circuit, and the control method comprises:

determining whether a recoverable protective action has occurred or stopped;

determining whether an inductor current drops to 0;

counting a count value during the recoverable protective action, wherein the count value during the recoverable protective action is accumulated from a time point when the inductor current drops to 0;

analyzing a discharge current of an output capacitor of the PFC circuit at least according to the count value when the recoverable protective action is stopped; and updating an output voltage controller according to the discharge current.

12. The control circuit for the PFC circuit according to claim 11, wherein the recoverable protective action is a cycle-by-cycle protection (CBC protection).

13. The control circuit for the PFC circuit according to claim 11, wherein after counting the count value, the control method further comprises:

setting a flag to a first default value;

wherein analyzing the discharge current is performed when the recoverable protective action is stopped and the flag is set to the first default value.

14. The control circuit for the PFC circuit according to claim 13, wherein after updating the output voltage controller according to the discharge current, the control method further comprises:

setting the flag to a second default value.

15. The control circuit for the PFC circuit according to claim 11, wherein analyzing the discharge current of the output capacitor of the PFC circuit includes:

obtaining a protection time length according to a product of the count value and a switching cycle of a Pulse Width Modulation (PWM) signal;

obtaining an output voltage variation during the recoverable protective action;

obtaining a ratio of the output voltage variation to the protection time length; and obtaining the discharge current according to the product of a capacitor value of the output capacitor and the ratio.

* * * * *